Patented Oct. 3, 1950

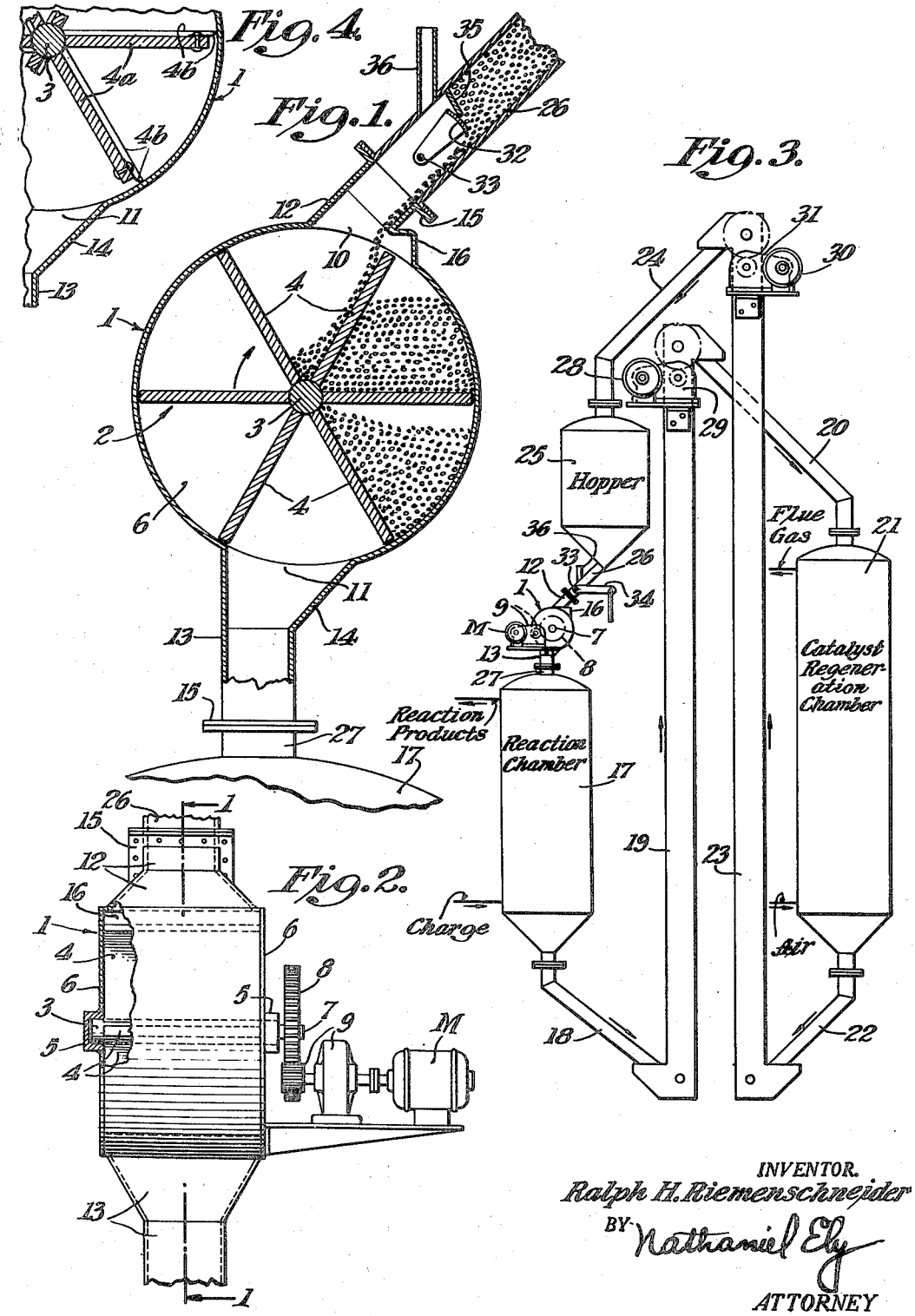

2,524,572

UNITED STATES PATENT OFFICE 2,524,572

CATALYST FEEDER

Ralph H. Riemenschneider, Pleasantville, N. Y., assignor to The Lummus Company, New York, N. Y., a corporation of Delaware Application May 9, 1946, Serial No. 668,633

7 Claims. (Cl. 198—50)

This invention relates to the handling of granular material and is concerned with prevention of crushing or abrasion of such material in a transfer operation required in certain processes. More particularly, the invention is concerned with the protection of granular material employed in a contact process in which the material is continuously transferred between zones which must be maintained at different pressures. For example, in a certain type of catalytic reaction system for hydrocarbon conversion a granular catalyst is continuously passed through a reaction zone and a catalyst regeneration zone in succession and thence back to the reaction zone. In some cases, in order to preserve a required pressure differential between the zones, the catalyst in passing from zone to zone is constrained to form a long sealing leg, which necessitates an objectionably tall apparatus. In other cases, the catalyst is passed from zone to zone through a mechanical sealing and feeding device. Such devices, however, often cause crushing or abrasion of the catalyst grains so that the size of the grains is reduced below that required for optimum performance. Fines are also produced and these are carried off with the reaction products or with the gases discharged from the regeneration zone. Much of the catalyst is thereby wasted.

An important object of the present invention is to provide, for the transfer or feeding of a granular material, an improved mechanism devised to protect the grains of the material from breakage or abrasion.

A further object of the invention is to provide an improved transfer mechanism of the "star feeder" type devised to protect the granular material and also form a gas seal.

These and other objects and advantages of the invention will appear from the following description taken in connection with the accompanying drawing.

In the drawing:

Fig. 1 is an enlarged vertical section on the line 1—1 of Fig. 2 and shows a feeder device embodying the invention;

Fig. 2 is a side view of said device, partly in section;

Fig. 3 is an elevation of a catalytic reaction system embodying the invention; and Fig. 4 is a detail vertical sectional view of the device, showing a modified form of the rotor blades.

Referring to the form of the invention shown in Figs. 1 and 2, the structure of the feeder device includes a substantially cylindrical drum-like casing 1 disposed with its axis horizontal, or substantially so. Within the casing there is a rotor 2 of the star-wheel type comprising a shaft or hub 3 and blades 4 extending radially from the hub and equally spaced therearound. In the present instance there are six of these blades but their number may be varied. The opposite ends of the hub are journalled in bearings 5 on the opposite end walls 6 of the casing. One end of the hub bears a stub shaft 7 to which a gear 8 is affixed. A motor M drives said gear, through reduction gearing 9, and rotates the rotor clock-wise, with reference to Fig. 1. At the upper side of the casing the circumferential wall thereof has an inlet port 10 and, at the under side of the casing, said wall has an outlet port 11. The port 10 is offset from the vertical center line of the rotor in the direction of rotation of the rotor, and a charging nozzle 12 on the casing extends upwardly from said port. A discharge nozzle 13, borne by the casing, extends downwardly from the outlet port. These nozzles lie within a vertical plane transverse to the axis of the rotor, and the nozzle 12 is inclined upwardly in the direction of rotation of the rotor. The discharge nozzle has the upper portion of its side toward the approaching blades inclined, as at 14.

Throughout most of its circumferential extent the casing is quite close to the path of movement of the outer edges of the rotor blades 4, and the end walls of the casing are quite close to the side edges of the blades, there being only sufficient clearance at all edges of the blades to permit free rotation of the rotor. At the under side of the charging nozzle 12, however, within the acute angle between the nozzle and the upper side of the casing, substantial additional clearance is provided. For that purpose, the circumferential wall of the casing is provided with an offset portion 16 located at the juncture of the under side of the nozzle and the circumferential wall of the casing and extending the full axial width of the inner surface of said wall. The offset 16 defines a clearance recess offset laterally from the path of the material falling through the inlet port. The provision of this additional clearance is an important feature of the invention, as will be explained hereinafter.

In Fig. 3 the feeder just described is shown embodied in a continuous catalytic reaction system of the type disclosed in a U. S. patent to Simpson et al., No. 2,320,318. In such a system a granular catalyst whose grains are preferably of bead form or pellet form are continuously passed downwardly through a reaction chamber 17. From the lower end of said chamber the catalyst is passed through a tubular chute 18, in sealed connection with the chamber, to the lower end of an enclosed endless conveyor 19, vertically arranged. Said chute is kept charged with the catalyst to form a sealing leg. Conveyor 19 elevates the catalyst and discharges it, through an inclined tubular chute 20, into a catalyst regeneration chamber 21. The regenerated catalyst is continuously discharged through an inclined chute 22, in sealed connection with the lower end of chamber 21, to the lower end of an enclosed endless conveyor 23, vertically arranged. Conveyor 23 elevates the catalyst and discharges it through an inclined tubular chute 24 into a closed hopper 25. Said hopper has an inclined tubular discharge chute 26 flanged at its lower end. My improved feeder device is interposed between the chute 26 and the reaction chamber 17, the flanged end of the inlet nozzle 12 of said device being detachably secured in sealed connection to said flanged end of the chute, and the flanged end of the discharge nozzle 13 of the device being detachably secured in sealed connection to a flanged inlet nozzle 27 projecting from the upper end of the reaction chamber.

The conveyor or elevator 19 is driven by a motor 28, through a reduction gearing 29, and the elevator 23 is driven by a motor 30, through a reduction gearing 31. The drives of said elevators are correlated to the capacity and the drive of the feeder rotor to ensure charging of the feeder device in a proper manner, as will be explained hereinafter.

Within the lower portion of the delivery chute 26 there is a "chopper" valve 32 comprising a segmental element affixed to a shaft 33 journalled on the chute and provided with an adjusting lever 34 operable by any suitable means from a convenient position. A baffle 35 projects inwardly from the upper side of the chute and blocks flow of the catalyst over the chopper valve. By adjusting the valve toward or from the lower side of the chute the thickness of the catalyst stream passing beneath the valve may be adjusted. Between the baffle 35 and the lower end of the chute the chute is provided with a vent nozzle 36. This nozzle may discharge to atmosphere.

In the operation of the feeder the inter-blade compartments of the rotor are brought in succession into register with the inlet port 10 of the feeder by rotation of the rotor clockwise, with reference to Fig. 1. Owing to the location of the port, no one of said compartments will receive the entering material until the advance blade of the compartment has passed the inlet port 10. Then the stream of material passing the chopper valve flows along the inclined lower side of the chute 26 and the nozzle 12 and down the inclined blade to the bottom of the compartment so that a gentle delivery of the material is obtained and abrasion is minimized. As the compartment is advanced across the inlet port it is charged to a desired degree by a correlation of the delivery through the inlet port with the size and rate of rotation of the rotor so that complete charging or filling of the compartments is prevented. Thereby, one safeguard against pinching, crushing or abrasion of the grains of the material is provided. Pushing of the material by the rotor is avoided and the material is merely lowered by the rotor until a blade thereof reaches the discharge port 11. Then, the material flows by gravity down the incline 14 of the nozzle 13 and is discharged through the nozzle.

It will be noted in Fig. 1 that when a rotor blade reaches the position for first admission of the material to the compartment at the left of the blade that the outer edge of said blade has moved past the delivery point of the nozzle and is in a position opposite the offset 16 in the circumferential wall of the casing. This offset is formed to afford material radial and circumferential clearance to avoid all danger of pinching of the grains between the outer edge of the blade and the casing. Another safeguard against pinching of the catalyst is the closeness of the rest of the casing to the edges of the rotor blades. The very slight clearance precludes entry of grains of the material between the blades and the casing.

A substantial gas seal is also obtained by the close relation of the blades to the casing. The sealing effect thus obtained adapts the feeder for satisfactory employment in the system shown in Fig. 3. Usually, in the operation of such a system, a higher pressure must be maintained within the reaction chamber 17 than in other parts of the system. The sealing effect provided by the feeder disclosed prevents objectionable leakage of gas from the reaction chamber past the rotor despite the fact that the rotor compartments at only one side of the axis are charged with the catalyst. It will be noted in Fig. 1 that the rotor and the casing are so designed as to ensure at all times a close relation of a plurality of the blades to the circumferential wall of the rotor at both the left of the axis and the right of the axis. At the left of the axis three of the blades are shown in close relation to said wall. At the right of the axis two of the blades are shown in such relation and, before the lowermost blade reaches the port 11, the uppermost blade will have passed the offset 16. Any small amount of gas which leaks past the rotor is vented through the nozzle 36 from the chute 26. The upper portion of the chute is kept fully charged with the catalyst from the hopper 25 so that escape of the gas in that direction is blocked.

Fig. 4 shows a modification of the rotor blades. Here, the edges of the blades 4a are spaced materially from the inner surfaces of the casing and are provided with flexible and resilient sealing strips 4b which bear against said surfaces for sealing effect. These strips may be made of any suitable material. For the service indicated in Fig. 3, a satisfactory material for the strips is asbestos with wire woven into it to impart resilience. A light-weight alloy steel strip will also be satisfactory.

It will be obvious that my invention provides a very simple and satisfactory feeder device designed throughout to fully protect the granular material handled from pinching, crushing and abrasion and designed also to provide an adequate seal. While the invention is disclosed in connection with a catalytic reaction system its utility is by no means limited to such employment. It may be satisfactorily employed in many other services where granular material is handled and preservation of the grains of material intact is required.

It is to be understood that the present disclosure of my invention is merely illustrative and is nowise limiting and that the invention comprehends such modifications as will come within the scope of the following claims.

I claim:

1. A feeder device for granular material, comprising a rotor mounted for rotation on a substantially horizontal axis and having blades equally spaced around the axis and extending radially outward, a casing enclosing said rotor and having a circumferential wall closely opposed throughout most of the circumferential extent thereof to the outer edges of the rotor blades and having an inlet port at the upper side of the casing and an outlet port at the lower side of the casing, for passage of the granular material through the casing under control of the rotor, said inlet port extending between a vertical line through the rotor axis and a point materially offset from said line, a chute in delivery connection with said inlet port to pass said material into the casing, said chute having a guide wall for the material located at the same side of said vertical line as said offset point and inclined downwardly toward said line in a plane transverse to the rotor axis, said chute wall being connected at the lower end thereof to said casing wall at said offset point and said casing wall having, at the juncture of said chute wall therewith, a portion relatively short circumferentially of the casing, materially offset radially outward from the path of the outer edges of the blades and extending the full axial width of said edges to prevent crushing of the material between the blades and said casing wall, means to control the rate of delivery of the material through said chute to said inlet port, and means for rotating the rotor in a direction to move the blades in succession first past the inlet port and across the line of fall of the material from said chute wall into the casing and then past said offset portion of said casing wall, the thickness of the blades at the outer edge thereof being substantially less than the width of the inlet port circumferentially of the casing.

2. A feeder device as claimed in claim 1 wherein the circumferential length of said radially offset portion of said casing wall materially exceeds the thickness of the outer edge of the blades.

3. A feeder device as claimed in claim 1 wherein portions of the circumferential wall of the casing at opposite sides of the rotor axis and extending between the inlet port and the outlet port are parts of a circle concentric with the path of the outer edges of the blades and each is of sufficient circumferential length to include a plurality of the blades.

4. A feeder device as claimed in claim 1 wherein said delivery control means includes adjustable means associated with the chute to adjust the depth of a stream of the granular material passed along said inclined wall of the chute to the inlet port.

5. A feeder device as claimed in claim 1 wherein the chute is tubular and has a gas outlet spaced above said inclined wall thereof.

6. A feeder device as claimed in claim 1 wherein the chute is tubular and said delivery control means includes a dam projecting inwardly from the upper side of the chute and toward said inclined wall thereof and a valve element adjacent said dam and operable to adjust the depth of a stream of the granular material passed along said inclined wall of the chute to said inlet port of the casing, and the chute has an outlet for gas located between said dam and the inlet port.

7. A feeder device as claimed in claim 1 including a tubular discharge chute connected to said casing around said outlet and extending downwardly therefrom, said discharge chute having a wall thereof extending from the side of said outlet first reached by the successive rotor blades in the movement thereof through the lower portion of the casing inclined downwardly in the general direction of said movement.

RALPH H. RIEMENSCHNEIDER.

REFERENCES CITED

The following references are of record in the file of this patent:

UNITED STATES PATENTS

| Number | Name | Date |
| --- | --- | --- |
| 1,143,634 | Lane et al. | June 22, 1915 |
| 1,433,109 | Brown | Oct. 24, 1922 |
| 1,437,863 | Raymond | Dec. 5, 1922 |
| 1,723,211 | Schmidt | Aug. 6, 1929 |
| 2,019,963 | Gillette | Nov. 5, 1935 |
| 2,037,809 | MacMullin | Apr. 21, 1936 |
| 2,126,425 | Thompson | Aug. 9, 1938 |
| 2,262,875 | Steel | Jan. 6, 1942 |